May 6, 1941.　　A. G. SUNDSTROM　　2,241,076
LADDER CARRIER
Filed Jan. 17, 1938
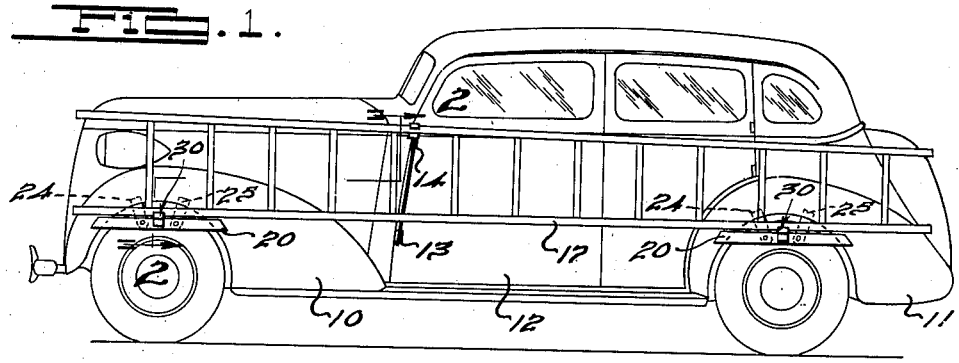
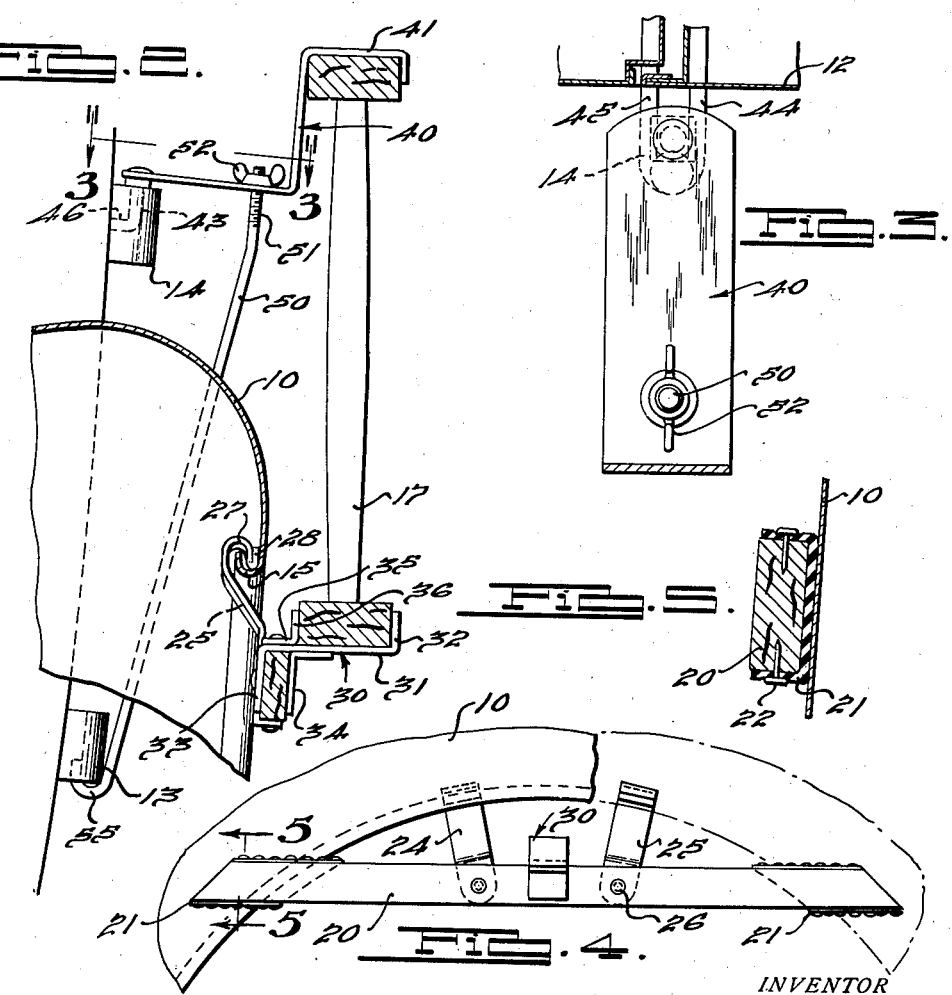
INVENTOR
Axel G. Sundstrom.
BY
Harness, Dickey & Pierce.
ATTORNEYS.

Patented May 6, 1941

2,241,076

UNITED STATES PATENT OFFICE 2,241,076

LADDER CARRIER

Axel G. Sundstrom, Detroit, Mich., assignor of one-half to Norman H. McColl, Detroit, Mich.

Application January 17, 1938, Serial No. 185,374

3 Claims. (Cl. 224—29)

The invention relates generally to motor vehicles and it has particular relation to devices for carrying ladders on vehicles.

It is quite usual to carry ladders on vehicles and this is particularly true in the case of painters, carpenters, and like tradesmen. As a rule, the ladders have been carried in various makeshift ways, and as examples, it is quite ordinary to see ladders carried under the vehicle between the wheels thereof, and on the top of the vehicle. In practically all instances, at least in so far as known, the arrangement for carrying ladders is of makeshift character as indicated previously, and usually the ladders are merely tied to the vehicle by means of ropes, wires, etc. In such cases, aside from the inconvenience and time required to place the ladders on the vehicle and in removing them, there is always the danger of the ladders becoming loose during transit.

One object of the present invention is to provide devices for mounting ladders on vehicles quickly and with little effort, while at the same time insuring that the ladders will not become loose during transit.

Another object of the invention is to provide devices of the above mentioned character which are mounted on the vehicle in a very simple manner, and without requiring any alteration in the structure of the vehicle.

Another object of the invention is to provide devices such as mentioned which can be manufactured very inexpensively, and which are very durable in use to the end that the initial cost and upkeep is so little that anyone will be able to employ the devices.

Another object of the invention is to provide devices such as mentioned which are of such character that the vehicle is not damaged in any way by using the devices.

Other objects of the invention will become apparent from the following specification, from the drawing to which it relates and from the claims hereinafter set forth.

For a better understanding of the invention, reference may be had to the drawing wherein:

Figure 1 is a side view of a motor vehicle equipped with devices constructed according to one form of the invention;

Fig. 2 is a cross-sectional view on a larger scale taken substantially along the line 2—2 of Fig. 1;

Fig. 3 is a cross-sectional view taken substantially along the line 3—3 of Fig. 2;

Fig. 4 is a view with certain parts broken away, illustrating one of the devices for supporting the ladder on the fenders of the vehicle;

Fig. 5 is a cross-sectional view on a larger scale taken substantially along the line 5—5 of Fig. 4.

Referring to Fig. 1, the front and rear fenders of the vehicle are indicated at 10 and 11, respectively, a door of the vehicle is indicated at 12, and the door hinges are indicated at 13 and 14. While a passenger type of vehicle is illustrated, it will be appreciated that the invention is applicable to different types of vehicles such as small commercial trucks. As shown by Fig. 2, each of the fenders has an inwardly and upwardly turned bead 15 around its outer edge, and at the present time most vehicles have fenders provided with this bead or one similar to it. Generally speaking, the arrangement includes a device associated with each of the two fenders shown for supporting the lower part of a ladder indicated at 17, and a device associated with the two hinges 13 and 14 for holding the upper side of the ladder.

Referring now to Figs. 2 and 4, each of the devices associated with the fenders includes a bar 20 which may be constructed of wood and this bar is of sufficient length that its ends contact with and rest against the outer side wall of the fender. For the purpose of preventing direct contact of the bar with the finished surface of the fender, such end portions of the bar may be covered by leather or the like indicated at 21 that is tacked thereto as indicated at 22, so that the leather engages the finished surface of the fender. Intermediate its ends, the bar is provided with two brackets 24 and 25, preferably constructed of strap steel and these may be fastened to the bar by means of rivets 26. It will be noticed in Fig. 4 that only one rivet is used to fasten each bracket to the vertical side of the bar, and it may be added that the rivet is not applied too tightly so that the bracket may be turned about the axis of the rivet as may be found necessary.

Each of the brackets extends above the bar and inwardly and terminates at its upper end in a hook 27, that is adapted to hook over the bead 15 of the fender. The extreme end of the bracket has a folded edge 28 and this is desirable not only to avoid sharp corner edges for engagement with the bead, but also for strengthening the end of the bracket. It will be noted that the upper end portion of the bracket is so arranged that with the hook portion engaging the bead 15, the bar 20 may be swung outwardly and then lifted without difficulty, and this relation facilitates connecting the device to the fender and removing it. Attention is directed to the fact that the brackets diverge upwardly and engage the bead at opposite sides of the uppermost point on the latter and this arrangement naturally stabilizes the mounting. Moreover, the pivotal character of each bracket enables disposing the brackets in positions radial to the bead regardless of the curvature of the bead edge of the fenders.

For engaging the lower side member of the ladder 17, a third bracket is hooked over the bar 20 between the brackets 24 and 25, and this third bracket comprises a metal strap 30 having a horizontal portion 31 upon which the lower side member of the ladder rests, an outer flange 32 that projects upwardly, and a flange at its inner edge indicated at 33 which extends downwardly along the inner side of the bar 20. A short metal angle 34 which may be welded or otherwise secured to the under side of the strap 30 provides in conjunction with the flange 33 a channel portion for embracing or hooking over the bar 20. Another metal angle 35 which may be welded or riveted to the upper side of the strap 30 has an upwardly directed portion 36, and this portion in conjunction with the flange 32 provides a channel for the lower side member of the ladder. The channel defined by the parts 33 and 34 embraces the bar 20 rather closely so as to prevent undesirable looseness, and while such parts might even be riveted or otherwise secured to the bar, there is no necessity for this as any load on the bracket is downward and by having the bracket loose on the bar, other brackets could be readily substituted. It may be mentioned that this bracket for engaging the lower side member of the ladder may be varied to accommodate several ladders, and specifically the flanges 32 and 36 may be spaced farther for this purpose. With one of the devices associated with each fender, it is apparent that a support for the front and rear ends of the ladder is thus provided.

For holding the upper side member of the ladder, a device is associated with the hinges 13 and 14 previously mentioned and this is best shown by Figures 2 and 3. This device comprises a metal bracket 40 having a channel portion 41 adapted to hook over and embrace the upper side member of the ladder and it will be understood that this channel portion may be wider so as to accommodate more than one ladder. The bracket 40 extends laterally towards the side of the car, and at its inner end a pin 43 is fastened thereto and this pin is adapted to project downwardly between the two leaves of the hinge 14. As shown more particularly by Figure 3, the two leaves of the hinge are indicated at 44 and 45 and ordinarily they are sufficiently spaced and there is sufficient room between the hinge pin and the body of the car to accommodate the pin 43. The pin may be straight but in certain instances, and as shown by Figure 2, it may be desirable to have the pin 43 terminate in an angled portion 46, adapted to prevent undesirable sidewise looseness. The bracket 40 is moved downwardly so as to insure its engagement with the ladder, by means of a rod 50 having a threaded upper end 51 projecting through an opening in the bracket and which is adapted to receive a wing nut 52. The lower end of the rod 50 terminates in a hook portion 55 which hooks upwardly between the two leaves of the lower hinge 13. It will now be apparent that the bracket 40 may be associated with the ladder and the upper hinge, the rod 50 associated with the lower hinge and its upper end passed through the opening in the bracket and then the wing nut 52 may be applied so as to draw the parts toward each other and tightly draw the upper bracket downwardly against the upper side portion of the ladder. It will be noted that the rod 50 angles downwardly towards the side of the car and has a straight upper portion passing through the bracket 40 and this facilitates drawing of the bracket downwardly, as will be readily understood.

While the devices shown and described may be constructed of various materials, it is preferable to use sheet metal for the several brackets and to use wood for the bar 20. As previously intimated, the parts may be varied so as to accommodate a plurality of ladders instead of one ladder as shown. Moreover, the arrangements may be varied so as to accommodate ladders varying considerably in width as the upper and lower brackets may be brought closer together or farther apart so as to permit this result. It is apparent that no difficult manufacturing problem is involved in making any part of the device, and that use of the devices is extremely simple. Such devices are applicable to practically any car having fenders and hinges and no change or alteration is required in order to apply the devices. The devices for the fenders may be applied in a few seconds time as it is only necessary to hook the brackets 24 and 25 over the bead 15 and then let the bar 20 swing downwardly until it engages the outer side of the fenders. Then the ladder may be disposed on the fender devices and the upper bracket hooked over the upper side of the ladder and the pin thereon disposed between the leaves of the upper hinge. Application of the rod 50 is very simple and tightening of the wing nut 52 so as to draw the upper bracket downwardly against the upper side of the ladder is easily effected. The parts can be disassembled and the ladder removed just as simply as they are assembled and all parts may be carried in the vehicle requiring but little space. No part of the automobile is damaged in any way by using the devices and as a matter of fact, the only substantial contact of the devices with any exposed part of the vehicle is with the outer sides of the fenders and in this case, the finished surface of the fender is protected. It may be noted furthermore that the ladder is so carried that it does not interfere with the driver's vision through the side windows.

Although only one form of the invention has been illustrated and described in detail, it will be apparent to those skilled in the art that various modifications may be made without departing from the scope of the appended claims.

What is claimed is:

1. In combination, a motor vehicle having a front fender, a rear fender, and a door hinged thereto by means of upper and lower leaf hinges, a device on each fender for supporting the lower side member of a ladder or the like, a bracket engaging the upper side of the ladder for holding the latter on the devices, means on the bracket and projecting downwardly between the leaves of the upper hinge, and means hooked between the leaves of the lower hinge and adjustably connected to the bracket for drawing the latter downwardly against the ladder.

2. In combination, a motor vehicle having front and rear fenders provided with inturned projections at their laterally outer side edges, and a device on each fender adapted to support a ladder or the like, said device comprising a bar extending along the laterally outer side of the fender and below the top of the latter and which rests against the laterally outer side of both the forward and rearward downwardly curved parts of the fender, a pair of brackets pivotally connected to the bar in spaced relation longitudinally to such bar and each having a hook portion extending upwardly and under the fender and being hooked over the projection for vertically supporting the bar, and means on the bar externally of the fender for supporting a ladder so that the weight of the ladder urges the bar downwardly and against the side of the fender, said pivotal connections being adapted to enable positioning the brackets substantially radially of the fender.

3. In combination, a motor vehicle having front and rear fenders provided with inturned projections at their laterally outer side edges, and a device on each fender adapted to support a ladder or the like, said device comprising a bar extending along the laterally outer side of the fender and below the top of the latter and which rests against the laterally outer side of both the forward and rearward downwardly curved parts of the fender, a pair of brackets connected to the bar in spaced relation longitudinally to such bar and each having a hook portion extending upwardly and under the fender and being hooked over the projection for vertically supporting the bar, and means on the bar externally of the fender for supporting a ladder so that the weight of the ladder urges the bar downwardly and against the side of the fender, the brackets being so connected to the bar that they are positioned substantially radially of the fender.

AXEL G. SUNDSTROM.